United States Patent
Marincola et al.

(10) Patent No.: US 10,600,044 B2
(45) Date of Patent: Mar. 24, 2020

(54) SOLAR LIGHTING WITH PAY-AS-YOU GO TECHNOLOGY

(71) Applicant: Angaza Design, Inc., Redwood City, CA (US)

(72) Inventors: Lesley Silverthorn Marincola, Redwood City, CA (US); Bryan Silverthorn, Austin, TX (US); F. Iannce, Mountain View, CA (US); Kurt Kuhlmann, Santa Clara, CA (US); Bryan Duggan, San Francisco, CA (US); Peter Zullo, Berkeley, CA (US); Victoria Arch, Menlo Park, CA (US)

(73) Assignee: ANGAZA DESIGN, INC., Redwood City, CA (US)

( * ) Notice: Subject to any disclaimer, the term of this patent is extended or adjusted under 35 U.S.C. 154(b) by 0 days.

(21) Appl. No.: 13/722,197

(22) Filed: Dec. 20, 2012

(65) Prior Publication Data

US 2013/0212005 A1     Aug. 15, 2013

Related U.S. Application Data

(60) Provisional application No. 61/578,104, filed on Dec. 20, 2011.

(51) Int. Cl.
  *G06Q 20/26* (2012.01)
  *H02J 3/00* (2006.01)
  *H05B 47/00* (2020.01)

(52) U.S. Cl.
  CPC .............. *G06Q 20/26* (2013.01); *H02J 3/008* (2013.01); *H05B 47/00* (2020.01); *Y04S 50/10* (2013.01); *Y04S 50/12* (2013.01)

(58) Field of Classification Search
  CPC . G06Q 20/26; H05B 47/00; H02J 3/00; H02J 3/008; Y04S 50/10; Y04S 50/12
  See application file for complete search history.

(56) References Cited

U.S. PATENT DOCUMENTS

| 4,326,102 A | 4/1982 | Culp et al. |
| 4,710,919 A * | 12/1987 | Oliver .................. H04M 11/002 340/12.16 |

(Continued)

FOREIGN PATENT DOCUMENTS

| EP | 1 755 242 | 2/2007 |
| GB | 2511270 | 9/2014 |

OTHER PUBLICATIONS

Anna. (Sep. 28, 2011). "Solaraid Partners with Eight19 in 'Pay-As-You-Go' Solar Trial," located at <http://old.solar-aid.org/about/2011/09/solaraid-is-thrilled-to-be.html?url=/about/2011/09/solaraid-is-thrilled-to-be.html> visited on May 14, 2013. (3 pages).

(Continued)

*Primary Examiner* — Kenneth Bartley
(74) *Attorney, Agent, or Firm* — Morrison & Foerster LLP

(57) ABSTRACT

Disclosed are devices and methods for providing solar lighting and power to a consumer using pay-as-you-go technology. The pay-as-you-go technology allows for a user to pay for home power and lighting on an incremental basis as they use the device. The payments are made using a user's cell phone. A pay-as-you-go lighting apparatus may include a lighting module configured to provide lighting to a customer when activated, and a control system including a processor and a memory configured to monitor usage of the lighting apparatus, track remaining usage credits, and disable the lighting apparatus when there are no remaining usage credits.

27 Claims, 11 Drawing Sheets

(56) References Cited

U.S. PATENT DOCUMENTS

| | | | | |
|---|---|---|---|---|
| 5,423,407 | A * | 6/1995 | Nikolic | G07F 15/003 194/217 |
| 5,451,755 | A * | 9/1995 | Duval | B60L 11/1816 235/375 |
| 5,696,695 | A | 12/1997 | Ehlers et al. | |
| 5,812,643 | A * | 9/1998 | Schelberg, Jr. | G07F 15/003 235/381 |
| 6,081,205 | A * | 6/2000 | Williams | B60L 3/0069 235/381 |
| 6,314,169 | B1 * | 11/2001 | Schelberg, Jr. | G06Q 20/127 235/381 |
| 6,745,106 | B2 * | 6/2004 | Howard et al. | 700/276 |
| 7,035,719 | B2 * | 4/2006 | Howard et al. | 700/295 |
| 7,098,772 | B2 * | 8/2006 | Cohen | 340/309.16 |
| 7,277,967 | B2 * | 10/2007 | Kao | G06F 11/3423 235/375 |
| 7,362,213 | B2 * | 4/2008 | Cohen | 340/309.16 |
| 8,543,505 | B2 * | 9/2013 | Pederson | 705/40 |
| 2002/0128932 | A1 * | 9/2002 | Yung et al. | 705/27 |
| 2002/0194468 | A1 * | 12/2002 | Betts-LaCroix et al. | 713/100 |
| 2003/0045968 | A1 * | 3/2003 | Howard et al. | 700/276 |
| 2004/0199299 | A1 * | 10/2004 | Howard et al. | 700/295 |
| 2005/0131810 | A1 * | 6/2005 | Garrett | 705/39 |
| 2006/0064037 | A1 * | 3/2006 | Shalon | A61B 5/0006 600/586 |
| 2006/0136544 | A1 * | 6/2006 | Atsmon et al. | 709/200 |
| 2006/0240890 | A1 * | 10/2006 | Walker et al. | 463/23 |
| 2007/0045411 | A1 * | 3/2007 | Honingford | G07F 15/003 235/381 |
| 2007/0053365 | A1 * | 3/2007 | Choi | 370/400 |
| 2007/0061268 | A1 * | 3/2007 | Herold et al. | 705/59 |
| 2007/0083479 | A1 * | 4/2007 | Swartz et al. | 705/412 |
| 2007/0197261 | A1 * | 8/2007 | Humbel | G06Q 30/00 455/558 |
| 2008/0125188 | A1 | 5/2008 | Huang | |
| 2008/0177678 | A1 | 7/2008 | Di Martini et al. | |
| 2008/0183307 | A1 * | 7/2008 | Clayton et al. | 700/8 |
| 2008/0319908 | A1 * | 12/2008 | Venkatachalam et al. | 705/50 |
| 2009/0096413 | A1 * | 4/2009 | Partovi et al. | 320/108 |
| 2009/0104874 | A1 * | 4/2009 | Ellis | 455/41.2 |
| 2009/0196016 | A1 * | 8/2009 | Massara et al. | 362/86 |
| 2009/0315485 | A1 * | 12/2009 | Verfuerth et al. | 315/320 |
| 2010/0030838 | A1 * | 2/2010 | Atsmon et al. | 709/200 |
| 2010/0094476 | A1 | 4/2010 | Hamilton, II et al. | |
| 2010/0114679 | A1 * | 5/2010 | Pan | 705/14.4 |
| 2010/0141153 | A1 * | 6/2010 | Recker et al. | 315/149 |
| 2010/0217549 | A1 | 8/2010 | Galvin et al. | |
| 2010/0264214 | A1 | 10/2010 | Gnanasambandam et al. | |
| 2010/0271802 | A1 * | 10/2010 | Recker et al. | 362/20 |
| 2011/0270764 | A1 * | 11/2011 | Mizani Oskui | 705/75 |
| 2011/0288992 | A1 * | 11/2011 | Needham et al. | 705/39 |
| 2011/0295706 | A1 * | 12/2011 | Urquhart | 705/16 |
| 2011/0299547 | A1 * | 12/2011 | Diab | G06Q 20/10 370/401 |
| 2012/0011007 | A1 * | 1/2012 | Blewett et al. | 705/16 |
| 2012/0052910 | A1 | 3/2012 | Mu et al. | |
| 2012/0080944 | A1 * | 4/2012 | Recker et al. | 307/25 |
| 2012/0112544 | A1 * | 5/2012 | Salcone | 307/65 |
| 2012/0197806 | A1 * | 8/2012 | Hill | 705/67 |
| 2012/0232714 | A1 * | 9/2012 | Ricket | 700/297 |
| 2012/0256585 | A1 * | 10/2012 | Partovi et al. | 320/108 |
| 2013/0013490 | A1 * | 1/2013 | Keller et al. | 705/39 |
| 2013/0041852 | A1 * | 2/2013 | Ellis | G06Q 50/06 705/412 |
| 2013/0095754 | A1 | 4/2013 | Moreton et al. | |
| 2013/0132267 | A1 * | 5/2013 | Moore et al. | 705/38 |
| 2013/0185194 | A1 * | 7/2013 | Moore et al. | 705/39 |
| 2013/0207481 | A1 | 8/2013 | Gobburu et al. | |
| 2013/0212005 | A1 | 8/2013 | Marincola et al. | |
| 2014/0054963 | A1 * | 2/2014 | Spitchka et al. | 307/40 |
| 2014/0168985 | A1 * | 6/2014 | Chien | 362/253 |
| 2015/0287263 | A1 | 10/2015 | Marincola et al. | |
| 2017/0116813 | A1 | 4/2017 | Marincola et al. | |

OTHER PUBLICATIONS

Elgan, M. (Jul. 28, 2012). "A new app lets you send pictures via sound," located at <http://www.computerworld.com/s/article/9229723/A_new_app_lets_you_send_pictures_via_sound?taxonomyId=77&pageNumber=1> visited on May 14, 2013. (4 pages).

Fairley, P. (Dec. 2004). "Lighting up the Andes," *IEEE Spectrum* 41(12): 44-49.

Gopalan, K and Wenndt, S. (2004). "Audio Steganography for Covert Data Transmission by Imperceptible Tone Insertion," *Communication Systems and Applications*: 1-5.

Holland et al. (Jul.-Aug. 2001). "Decentralised Rural Electrification: Critical Success Factors and Experiences of an NGO," *Refocus* 2(6): 28-31.

Iannacci, F and Huang, Y. (Jun. 5, 2010). "ChirpCast: Data Transmission via Audio," located at <http://www.cs.washington.edu/education/courses/cse561/10sp/projects.html> visited on May 14, 2013. (7 pages).

Prandoni, P. (1998) "Perceptually Hidden Data Transmission Over Audio Signals," *Acoustics, Speech, and Signal Processing* 6(6): 3665-3668.

Robin, B. (May-Jun. 2006). "Subsidized Solar Lighting: The Only Option for 1 Billion People," *Refocus* 7(3): 36-39.

Ulbricht, M. (Jun. 13, 2011). "SharedSolar: Mobiles and Micro-Grids for More Efficient Energy," located at < http://web.archive.org/web/20110617072506/http://mobileactive.org/case-studies/SharedSolar-mobiles-and-micro-grids> visited on May 14, 2013. (5 pages).

Texas Prepaid Electricity—Texas No Deposit Electricity. (2011). "We Have the Answer: Get SmarTricity with Flex Pay,"located at <http://www.paylesspower.com/prepaid_electricity.aspx> visited on May 14, 2013. (2 pages).

Search Report and Written Opinion dated Mar. 25, 2013, directed to International Application No. PCT/US12/71043; 9 pages.

Marincola et al., U.S. Office Action dated Aug. 4, 2015, directed to U.S. Appl. No. 14/662,077; 8 pages.

Marincola et al., U.S. Office Action dated Dec. 17, 2015, directed to U.S. Appl. No. 14/662,077; 11 pages.

Notification of the Second Office Action dated Jul. 29, 2019, directed to CN Application No. 201580025841.0; 14 pages.

Examination Report dated Dec. 13, 2018, directed to Indian Application No. 6072/DELNP/2014; 6 pages.

Examination Report dated May 17, 2019, directed to AP Application No. 2016/009510; 4 pages.

International Search Report and Written Opinion dated Jul. 28, 2015, directed to International Application No. PCT/US15/21287, 15 pages.

Marincola et al., Office Action dated Sep. 26, 2017, directed to U.S. Appl. No. 15/254,791; 6 pages.

Notification of the First Office Action dated Dec. 13, 2016, directed to CN Application No. 201280068463.0; 25 pages.

Notification to Grant Patent Right for Invention dated Jun. 2, 2017, directed to CN Application No. 201280068463.0; 4 pages.

Office Action dated Feb. 2, 2019, directed to CN Application No. 201580025841.0; 6 pages.

\* cited by examiner

SOLAR LIGHTING WITH PAY-AS-YOU GO TECHNOLOGY

CROSS-REFERENCE TO RELATED APPLICATION

This application claims the benefit of U.S. Provisional Application No. 61/578,104, filed Dec. 20, 2011, the entire contents of which are incorporated herein by reference.

FIELD OF THE INVENTION

This invention relates to devices and methods for providing lighting and power to a consumer using pay-as-you-go technology. The pay-as-you-go technology allows for a user to pay for power and lighting on an incremental basis as they use the device. The payments are made using a cell phone.

BACKGROUND OF THE INVENTION

Currently, more than 1.5 billion people lack access to electricity. Further, more than 4 billion people, the majority of the population, reside at the bottom of the socioeconomic pyramid—the so called "base of the pyramid." Base of the pyramid households spend up to 30% of their income on expensive batteries and low-quality, dangerous fuel-based sources of light, such as kerosene, to meet their energy needs. Each night, children and adults alike in these households inhale toxic kerosene fumes. Children struggle to study by dim kerosene light. Families travel hours to the nearest source of electricity to charge their cell phones or buy batteries. Accordingly, a need exists for a safe and economical way of providing light and energy to base of pyramid households.

Mobile money payment systems are known. For example, U.S. Patent Publication No. 2011/0270764 describes a method and system for performing electronic transactions using a point of sales device. This publication describes allowing a user to make payments at a point of sales device using the user's cellphone. However, this application does not describe methods and devices for keeping track of a user's light or energy usage and allowing a user to pay for these services on an incremental basis.

SUMMARY OF THE INVENTION

The two largest barriers to scale off-grid energy access in the developing world are: 1) a lack of effective customer financing for high-performance, high-quality solar energy products; and 2) the inability of for-profit companies to expand and grow if operating under slim sales margins and a reliance on large volume sales to counteract these small margins.

To deal with these barriers the inventors have developed the disclosed pay-as-you-go (PAYG) technology for light and power systems. As shown in FIG. 1, the PAYG technology allows for solar lighting and power systems to be within the financial reach of households that were previously dependent upon kerosene for lighting by allowing these household to pay for lighting systems in small increments over time at a cost less than they currently pay for kerosene. Lowering the upfront down payment from a $50-60 retail price to less than $15 allows for the light system to be financially accessible to over 90% of the rural off-grid market segment. Integrated hardware and firmware within the light system regulates energy output and enables or disables the light system depending on the receipt of a mobile money payment by the user.

As shown in FIG. 1, the lighting system links to a phone operated by a customer. The upfront cost to the customer is <$15 and they pay for "energy credit" as they use the light system. Using existing mobile money infrastructure, a customer initiates sending the lighting system provider (here ANGAZA) a payment (for example, about $1.50-2/week) via USSD, SMS, SIM Application Toolkit (STK), or any other protocols. Once the provider receives that payment, a voice call to the cell phone operated by the customer is initiated. The customer then simply holds the cell phone in close proximity to the lighting system to activate it for a proportional amount of "energy credit". Using FSK technology (Frequency-Shift Keying—or the transmission of information through discrete frequency changes in audible noise), high-frequency audible noises are played through the speaker on the cell phone and received by an internal microphone in the lighting system. A microprocessor within the lighting system's circuitry decodes the data embedded in the high-frequency noises and unlocks and enables the light for the specified amount of time.

In addition to allowing for the activation of the lighting system via the cellular network, the lighting system also stores usage and maintenance diagnostic data and can transmit these data back to the provider using the cellular network. An embedded speaker within the lighting system works with the internal microprocessor to encode these usage/diagnostic data into high-frequency noise that is then transmitted back to the provider through the customer's open voice call channel. The provider can track information such as exactly how many hours of light the customer uses per night or with what efficiency the solar panel is operating. With these data, the provider can design more appropriate products for its customers as well as provide automated maintenance feedback for their specific unit—such as a notification of a needed battery replacement via a text message to the customer's cell phone. The ability to track specific usage of particular light systems also enables eligibility for carbon credit programs as proof that the lighting systems are directly replacing kerosene use.

The entire two-way communication—from the customer initiating a mobile money payment to a complete two-way data transfer between the provider and the lighting system can take, for example, approximately 30 seconds and is completely automated.

Embodiments of a pay-as-you-go electrical apparatus for providing power to a device may include a power module configured to provide power to a device when activated. The electrical apparatus may also include a control system including a processor and a memory configured to enable the electrical apparatus when activated with usage credits, monitor usage of the electrical apparatus, track remaining usage credits, and disable the electrical apparatus when there are no remaining usage credits. The electrical apparatus may further include a battery for powering the electrical apparatus. The device powered by the electrical apparatus may include a lighting unit. The power module may also include an electrical outlet to connect the device. The power module may also include one or more LED lighting sources.

The electrical apparatus may further include a speaker configured to generate audible signals for communicating with a provider system through a telephone, and a microphone configured to receive audible signals for communicating with the provider system through a telephone. The electrical apparatus may further include a solar panel configured to charge the battery. The electrical apparatus may be configured to update usage credit information by communicating with a provider system. The electrical apparatus may also be configured to communicate with the provider system using SMS text messages.

Embodiments of a pay-as-you-go lighting apparatus may include a lighting module configured to provide lighting to a customer when activated. The lighting apparatus may include a control system including a processor and a memory configured to enable the lighting apparatus when activated with usage credits, monitor usage of the lighting apparatus, track remaining usage credits, and disable the lighting apparatus when there are no remaining usage credits. The lighting apparatus may further include a battery for powering the lighting apparatus. The lighting module may include an electrical outlet to connect a device. The lighting module may also include one or more LED lighting sources.

The lighting apparatus may include a speaker configured to generate audible signals for communicating with a provider system through a telephone, and a microphone configured to receive audible signals for communicating with the provider system through a telephone. The lighting apparatus may also include a solar panel configured to charge the battery. The lighting apparatus may also be configured to update usage credit information by communicating with a provider system. The lighting apparatus may further be configured to communicate with the provider system using SMS text messages.

Embodiments of a method for providing lighting at a pay-as-you-go lighting apparatus may include registering a pay-as-you-go lighting apparatus to a user, obtaining energy credit information for the user and the lighting apparatus from a provider system, enabling the lighting apparatus to provide lighting in accordance with the energy credit information, and transferring usage information concerning the lighting apparatus to the provider system. The method for providing lighting at a pay-as-you-go lighting apparatus may further include generating audible signals for two-way communications between the lighting apparatus and the provider system, and transmitting the audible signals using a telephone. The audible signals may include data identifying a location of the lighting apparatus.

Another embodiment of a method of managing pay-as-you-go lighting apparatuses may include receiving a payment message associated with a user, encoding an audible message for a pay-as-you-go lighting apparatus, transmitting the encoded message to the user over a telephone network, and receiving an audible message from the pay-as-you-go lighting apparatus. The payment message may identify the lighting apparatus.

The method of managing pay-as-you-go lighting apparatuses may further include pairing the payment message with an account and the pay-as-you-go lighting apparatus. The audible message received from the lighting apparatus may confirm that the encoded audible message received by the lighting apparatus designates the lighting apparatus.

The method of managing pay-as-you-go lighting apparatuses may further include initiating a telephone call to transmit the encoded message. The encoded message may include a body and at least one of a preamble, a number identifying a type of message, and an authentication code. The body of the encoded message may include a software update, a code to unlock the lighting apparatus, or a test sequence to identify technical issues with the lighting apparatus.

The method of managing pay-as-you-go lighting apparatuses may further include aggregating data collected from multiple lighting apparatuses, updating a profile for each of the lighting apparatuses, identifying lighting apparatuses with overdue payments based on an average energy usage determined from the profile for each of the lighting apparatuses, and messaging users about the overdue payments and diagnostic information determined by analyzing the data collected.

DETAILED DESCRIPTION OF THE INVENTION

Described are devices and methods for providing solar lighting and power to consumers using pay-as-you-go technology. In low-income areas, the upfront purchase price of solar systems is prohibitively expensive, but customers can afford to pay for these systems in small increments over time. The pay-as-you-go technology allows for a user to pay for home power and lighting on an incremental basis as they use the lighting device. The payments are made using a cell phone operated by a user. As described herein, the devices and methods allow users who may not be able to pay for the upfront costs of solar power and lighting to afford these services.

Figure 1:
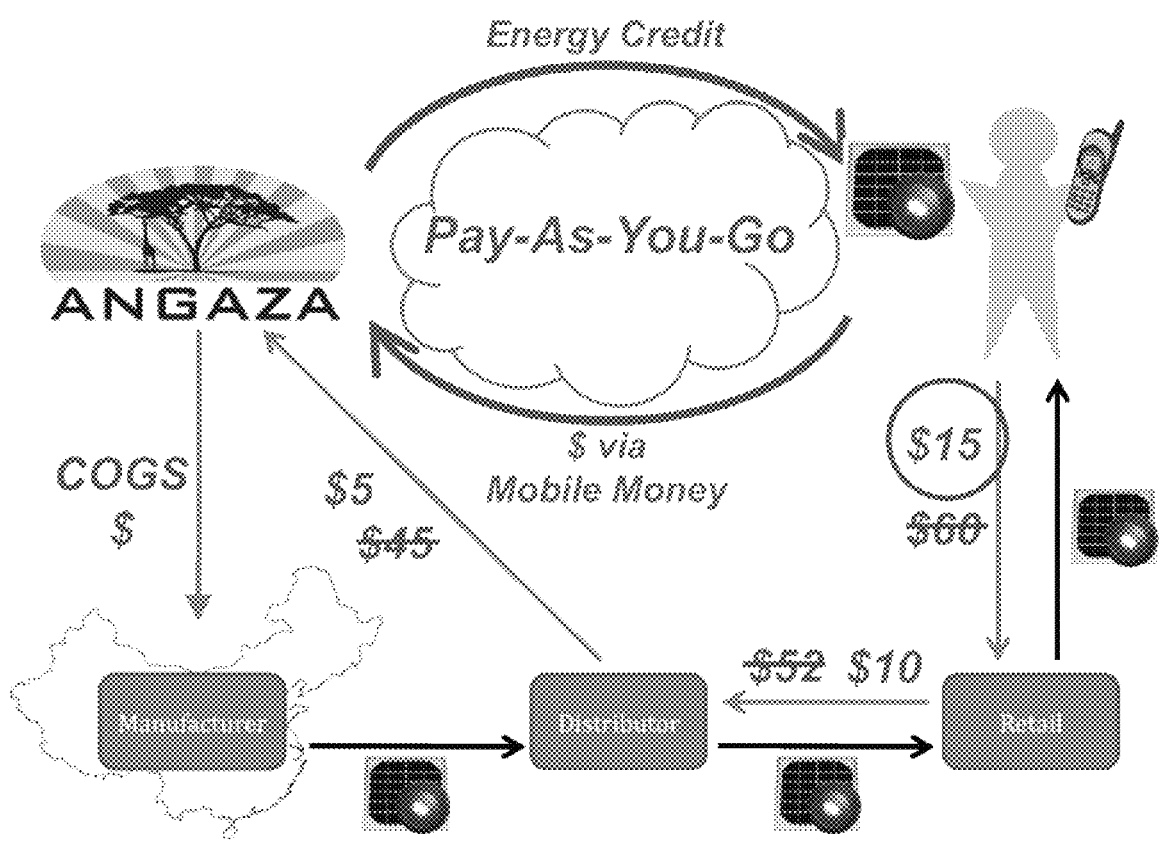
FIG. 1 is a diagram of how the described apparatus and methods can reduce the initial cost of lighting systems.
Figure 2A:
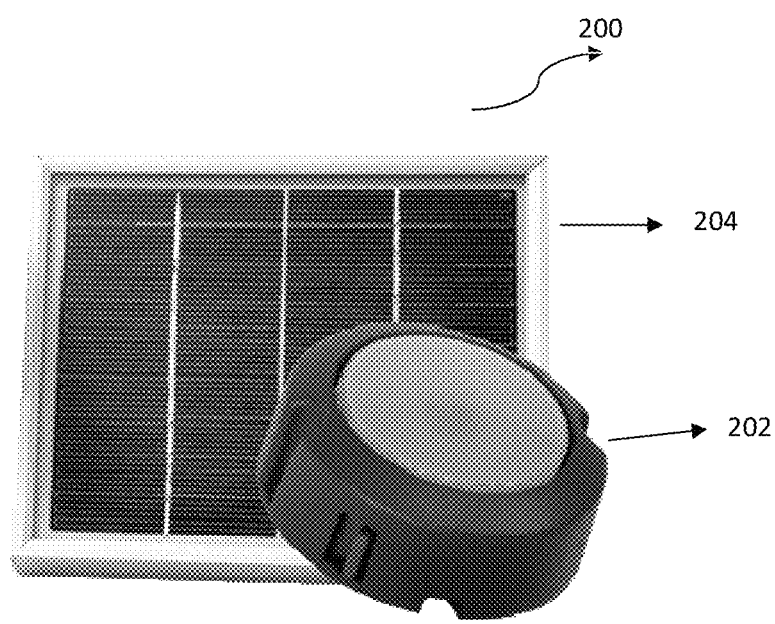
FIG. 2A is a diagram of the components of a solar lighting system according to embodiments.
Figure 2B:
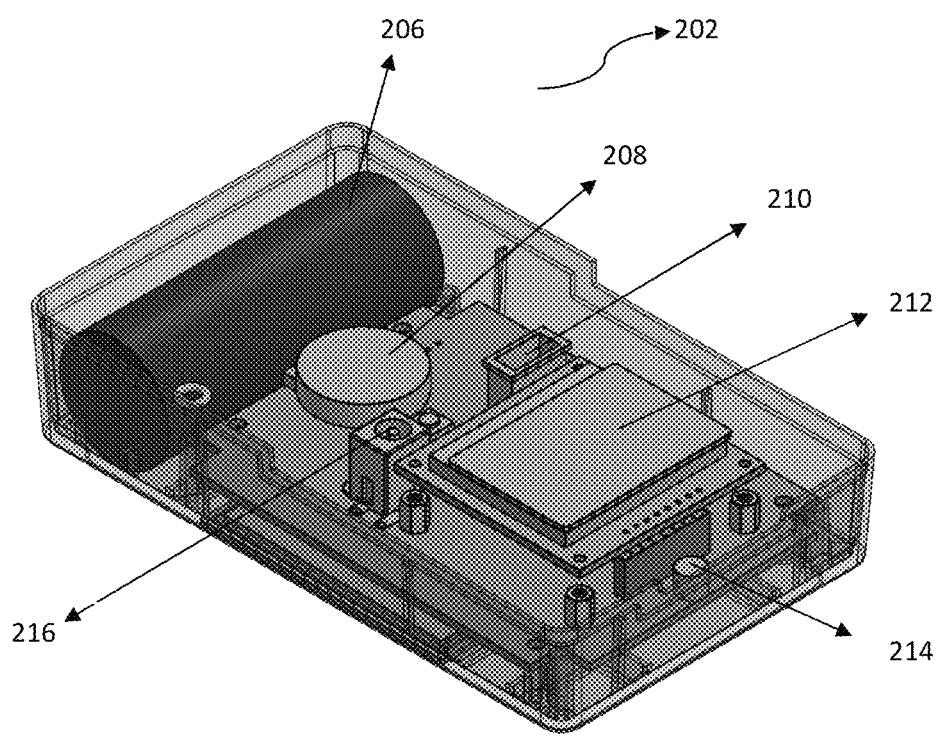
FIG. 2B is a diagram of the components of a solar lighting system according to embodiments.
Figure 2C:
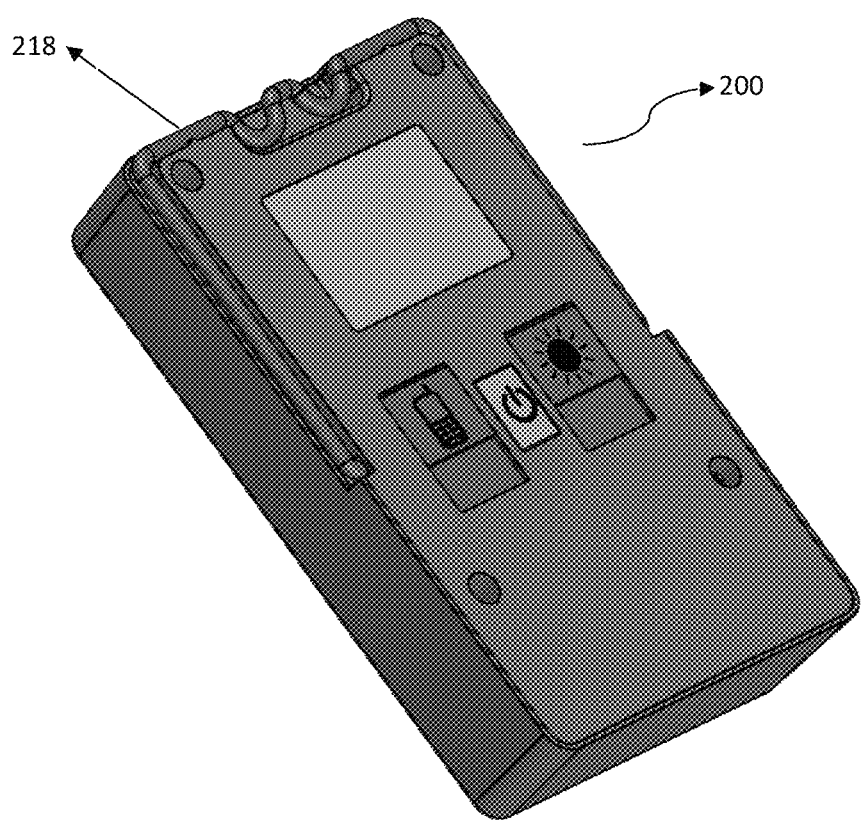
FIG. 2C is a diagram of an angled view of a light module according to embodiments.
Figure 2D:
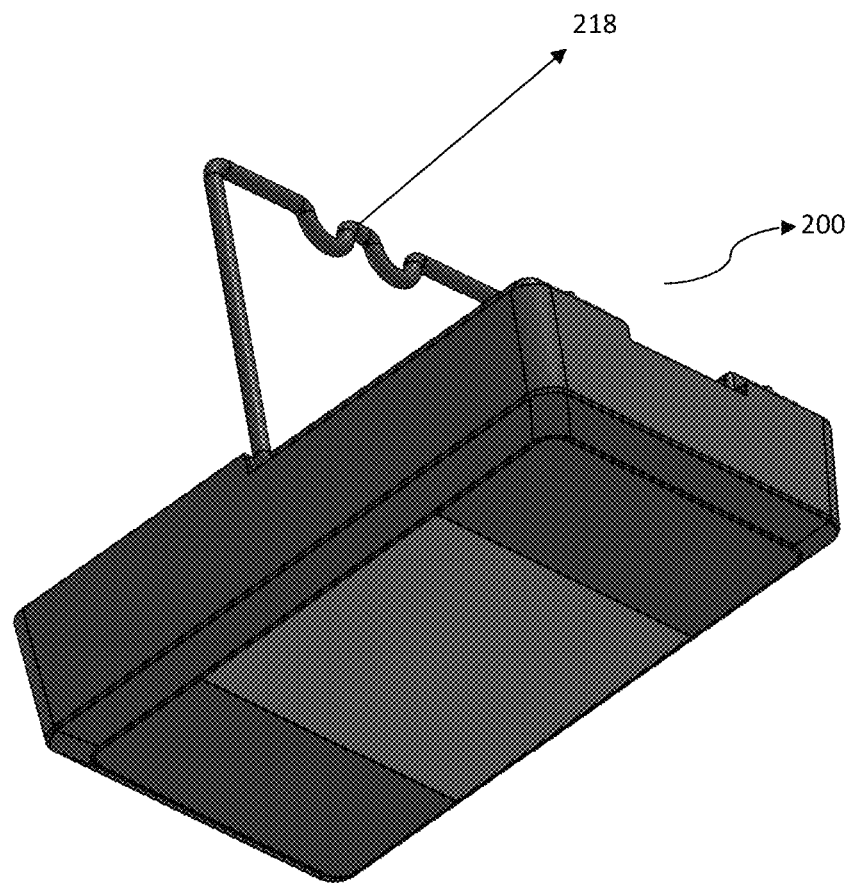
FIG. 2D is a diagram of a side view of a hanging light module according to embodiments.

FIGS. 2A, 2B, 2C and 2D show the components of a solar light and power system 200 according to various embodiments. The solar lighting system includes a LED light module 202 and a solar charging system 204. The light module 202 includes a rechargeable battery 206, a speaker 208, a USB cell phone charging jack 210, an LCD screen 212, a microphone 214, and a solar panel jack 216. FIG. 2C shows an exterior angled view of the light module 202 according to various embodiments. FIG. 2D shows an exterior view of the light module 202 as it would appear hanging by a wire hanger 218. The light module 202 is designed to either be permanently mounted to the ceiling of a customer's home with fixed screw holes or hung from a string or other object with a wire hanger 218 attached to the back of the light. Preferably, the light module 202 produces sufficient light to brightly illuminate a room so that an entire family can read or work by it. The ambient illumination it provides to the room allows people to move and interact with each other easily and clearly.

The light module 202 may, for example, include 2 LEDs to produce 200 lumens of light while consuming only 2 W of power. These LEDs may be CREE wide dispersion and high efficiency LEDs. LED lights are preferred over fluorescent or incandescent lights for lower power consumption and higher resiliency. However, other lighting sources including fluorescent and incandescent lighting may be used in some embodiments.

Figure 3:
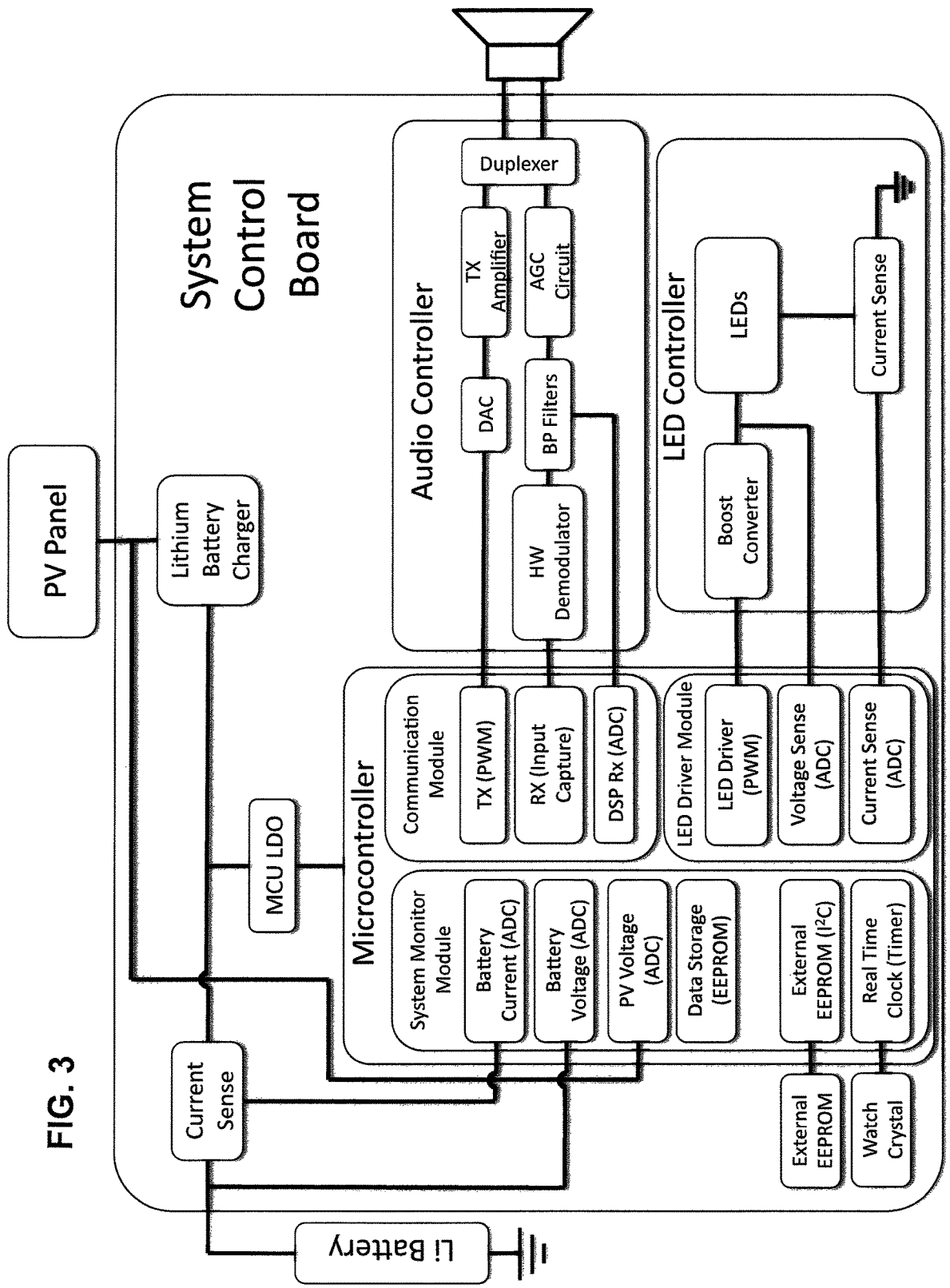
FIG. 3 is a diagram of a system control board according to embodiments.

The LED light module 202 may also include a system control board as shown in FIG. 3. The system control board may include, for example, a microcontroller, Li-ion charging circuitry, LED drive and control circuitry, cell phone charging circuitry (not pictured), and audio control circuitry. The system control board allows the LED lighting system to implement the pay-as-you-go payment method as described herein.

The LED light module also includes an internal rechargeable battery, such as a lithium-ion (Li-Ion) or lithium-ion-phosphate battery. The battery allows for the system to produce power and light during all hours of the day and night. An example of a lithium-ion battery is a 3.7V single-cell battery with a capacity of 2600 mAh and internal charge protection circuitry. Energy credits may regulate charging the battery, or the battery may be charged at all times and the energy credits regulate output from the battery.

The Li-Ion charging circuit may use a battery management integrated circuit so when the solar panel voltage (for example, 5.5V) is above the battery voltage (for example, 3.7V), the battery charges; this is a linear charger design. The battery charging may shut off when the PV panel voltage drops below the battery voltage or once the battery is fully charged. The lithium battery charger may be controlled internally with microcontroller, or use a separate integrated circuit chip.

The LED light module 202 may also include an LED driver module that allows the user to control the light output of the LED module. For example, the light's high setting may use the LED driver—a buck-boost converter to step the voltage up for the LEDs. This may provide a constant current through the LED array (2 LEDs) to maintain a constant light output. The light's medium setting may use, for example, a 555-Timer that creates a PWM (Pulse-Width Modulation) pulse to turn the LED driver integrated circuit on and off at high frequency to create a lower brightness. This configuration is more efficient than just turning on one of the LEDs because the buck-boost converter is most efficient with both LEDs on. The light module 202 may, for example, provide 4 hours of light on its brightest setting, and 8 hours of light on the less bright setting, after a typical day's charge in variable sunlight.

The LED controller controls current through LEDs to maintain a constant light/energy output. This part of the circuit is regulated such that, if there is no "energy credit" remaining, the LEDs will not turn on.

The light module 202 may also include a power outlet or adapter that allows a user to use the system to power their electrical devices, for example, to charge their cell phone. The system can keep track of the number of watts used by the user and charge the user accordingly. In some embodiments, the light module can be replaced or augmented with a power station module with the disclosed pay-as-you-go technology. The power station can be used to power a user's electrical devices, keep track of their power usage and implement the PAYG system described herein.

The system may employ different types of metering to market the system in different ways. For example, the system may employ time-based metering to allow the customer to pay per period of time the system is used, rather than the amount of energy consumed by the system. The customer may also pay per device being powered by the system, according to the type of device being powered, or light brightness settings used by the system. The lighting system may record energy consumed, a period of time when energy is consumed, or other per-unit information, and can deactivate the system after any energy credit is depleted. In some embodiments, a fixed cost per watt-hour or per hour may be used. In the cost per hour pricing, using a low light brightness setting for three hours may, for example, cost the same as using a high brightness setting for the same period of time, and costs for charging a cell phone may be based on how long the phone is plugged into the system. These different types of metering provide different ways to market the lighting system based on different pricing schemes.

The pay-as-you-go technology can be used to collect payments that accrue towards an eventual pay-off price, at which point the customer is no longer required to make payments. In this rent-to-own model, the provider sends a final message to the unit after the customer pays a final price, which effectively ends the payment period. The final message can be structured as sending a large or infinite amount of energy credits for the unit, changing the customer cost to zero, or sending an "unlock" code. Alternatively, the pay-as-you-go technology can be used as a subscription service that requires customers to make payments throughout the entire period that they own the device.

The system control board shown in FIG. 3 allows for implementation of the PAYG system by allowing for communication with a server though a telephone (preferably, a cell phone operated by a user). Communication may be implemented using FSK with DSP (Digital Signal Processing) within the microcontroller of the system control board or by using BFSK (Binary FSK) with hardware-enabled demodulation. Messages may also be transmitted using MFSK (multiple frequency), QAM, PSK, ASK, or any other communication scheme. Although this disclosure often refers to an audio-band encoding scheme to transfer messages between the provider and the lighting unit, the disclosed PAYG system can also be implemented using other communication systems. For example, the system control board may encode messages in an audio-band signal, text message (with a GSM-enabled lighting system), or data connection (for example: GPRS).

The entire communication, or any part thereof, may be conducted over any combination of networks including cellular, plain old telephone service (POTS), the internet and forms of packet switched networks, voice over Internet Protocol (VoIP), or the like.

The system control board in FIG. 3 includes a memory data storage device, for example an EEPROM. The light module 202 actively collects, logs, and stores information in the data storage device. This data can be transferred through two-way communications with the provider, and then erased or re-written. The data may be transferred to the provider during each communication sequence automatically and without the customer's knowledge.

The collected data may include function-specific energy consumption information, such as the amount of watt-hours consumed for light compared to cell phone charging. Other examples of data include temperature information measured by a thermistor, battery monitoring information such as efficiency/capacity/lifetime, solar panel monitoring information such as efficiency, and real-time clock data such as the amount of energy used per hour per day. Other examples include detailed usage data—i.e. how many hours the light is on, on which day, and on which brightness setting; and credit information—i.e. how many energy credits are available and have been used.

The audio controller is connected to an internal microphone (or transceiver) and converts incoming messages into electrical signals and is connected to an internal speaker (or transceiver) that converts electrical signals to audible tones. Amplifiers and assisting circuitry help to correctly identify audible tones that are part of the message versus background noise. The tones that encode data may be transferred between the system and the provider using a speaker and microphone. Alternatively, a direct physical connector (e.g., a cable) can be used to transfer the tones.

The system control board allows the light module 202 to operate in multiple states. These states can include OFF, the multiple brightness settings described above, and "Communication Mode." Communication Mode may be a distinct mode that the user can switch into with a physical switch or button on the light module 202. This mode will signal the microprocessor/microphone to listen for and interpret incoming sounds from a cell phone and enable encoding to transmit data out through the speaker. The addition of this distinct mode conserves processing power and thus battery life, as well as mitigates the need to always distinguish between background noise and incoming encoded FSK data.

The Communication Mode may be automatically activated for a period of time without customer intervention. This facilitates ease of use because the customer is not required to manually switch the device into Communication Mode. Energy consumption may be minimized by, for example, listening at occasional intervals or by buffering audio samples and only processing them at occasional intervals. In another embodiment, the unit may not employ a Communication Mode and may remain active to continually or periodically process audio by scanning for communication attempts.

The LED light module 202 may provide different battery modes optimized for efficient use and battery consumption. For example, modes may include full, reserve, storage, and dead. This feature manages battery life by cutting off voltage to different parts of the lighting apparatus at different times. For example, the battery can be used for normal operations in full mode and the battery can be used for limited operations in reserve mode. In reserve mode, battery power may not be used for light and cell phone charging because power is reserved for the microcontroller listening cycle. This allows the customer to add energy credit to the lighting apparatus through the communication sequence. In storage mode, energy output and the microcontroller listening cycle may be disabled until "woken up" by the customer. This is a deliberate mode for long term storage and shipping when the battery is fully charged. Finally, the battery may be in dead mode when the battery is completely drained and no energy remains for light or communication.

The light module 202 may also include a battery level indicator. The battery level indicator may be implemented using the existing lighting LEDs, additional LEDs, a small display screen, or the internal speaker to communicate to the customer the current charge level of the internal battery. The light module 202 may also include an "energy credit" level indicator. The energy credit indicator can be implemented using the same types of communication methods described with respect to the battery level indicator. This indicator communicates to the customer how much "energy credit" remains to alert when the customer needs to refill the pay-as-you-go system with additional money to keep the light activated. The lighting LEDs may indicate different settings and functional states by color. For example, red and green LEDs may be used to indicate remaining energy credit. A steady lit red light may indicate that all energy credits are depleted. A flashing red light may indicate that energy credit is low. A green light may indicate sufficient energy credit to maintain normal operations.

The small display screen of the light module 202 may include a real-time readout of power remaining in the lighting system, shown in hours and minutes to indicate any remaining energy in the unit before the battery is depleted. This readout provides active feedback data to help the customer manage energy consumption. The display screen may also provide technical support information, such as the serial number and phone number for technical support, current energy credit associated with the unit, current battery charge level, real-time battery power feedback, solar panel charge strength, and the like.

The solar charging system 204 includes a solar panel. This solar panel may, for example, capture energy from the sun through high-efficiency monocrystalline photovoltaic (PV) cells, and convert it into the electricity used to charge an internal lithium-ion battery of the light module 202. These monocrystalline cells allow the design to have a smaller package size for easier shipping and distribution, as well as a higher energy output during inclement weather, such as rains or clouds. Preferably, the solar cells are encased in a completely weather-proof and UV-resistant casing that will last for over 20 years with proper care. The PV cells may be laminated under a calibrated pressure and heat process to a protective substrate that effectively encapsulates the otherwise thin and brittle cells. The lamination may then be protected with an aluminum frame and sealed with water resistant sealant. The solar panel may be permanently mounted to the roof of a user's house with attached metal brackets, with a wire running from the panel to the inside of the house where it is plugged into the lighting unit.

The solar charging system 204 charges the internal lithium-ion battery of the light module 202. The charge circuitry may be integrated with the solar panel regulation circuitry to reduce the manufacturing costs associated with the printed circuit boards. The battery pack and associated circuitry may be housed in the light module 202 as described above. The following Table 1 summarizes some of the attributes of the solar charging system 204.

TABLE 1

| Specification | Metric |
| --- | --- |
| Solar Technology | Encapsulated Monocrystalline |
| Charging Power | ~2 W |
| Solar Panel Voltage | 6.5 VDC |
| Solar Panel Current | 0.35 A |
| Output Voltage | 5 VDC |
| Connection | Coaxial Power Connector |

In some embodiments, the solar panels may be daisy-chained together when customers invest in multiple lighting systems 200. Customers can thus create their own home lighting network throughout multiple rooms without requiring a large upfront expenditure. The lighting system is also well suited for larger community centers, schools, and businesses that require multiple lights. In some embodiments, high power solar systems can include a central "hub" that the user interacts with to enable pay-as-you-go. Lights and other appliances may all plug into a "hub," which regulates energy output and energy credit for all the associated appliances.

The operation of the solar lighting system and the methods for implementing the pay-as-you-go process will be further explained with respect to the following process flow diagrams.

Communication Flowchart

Figure 4A:
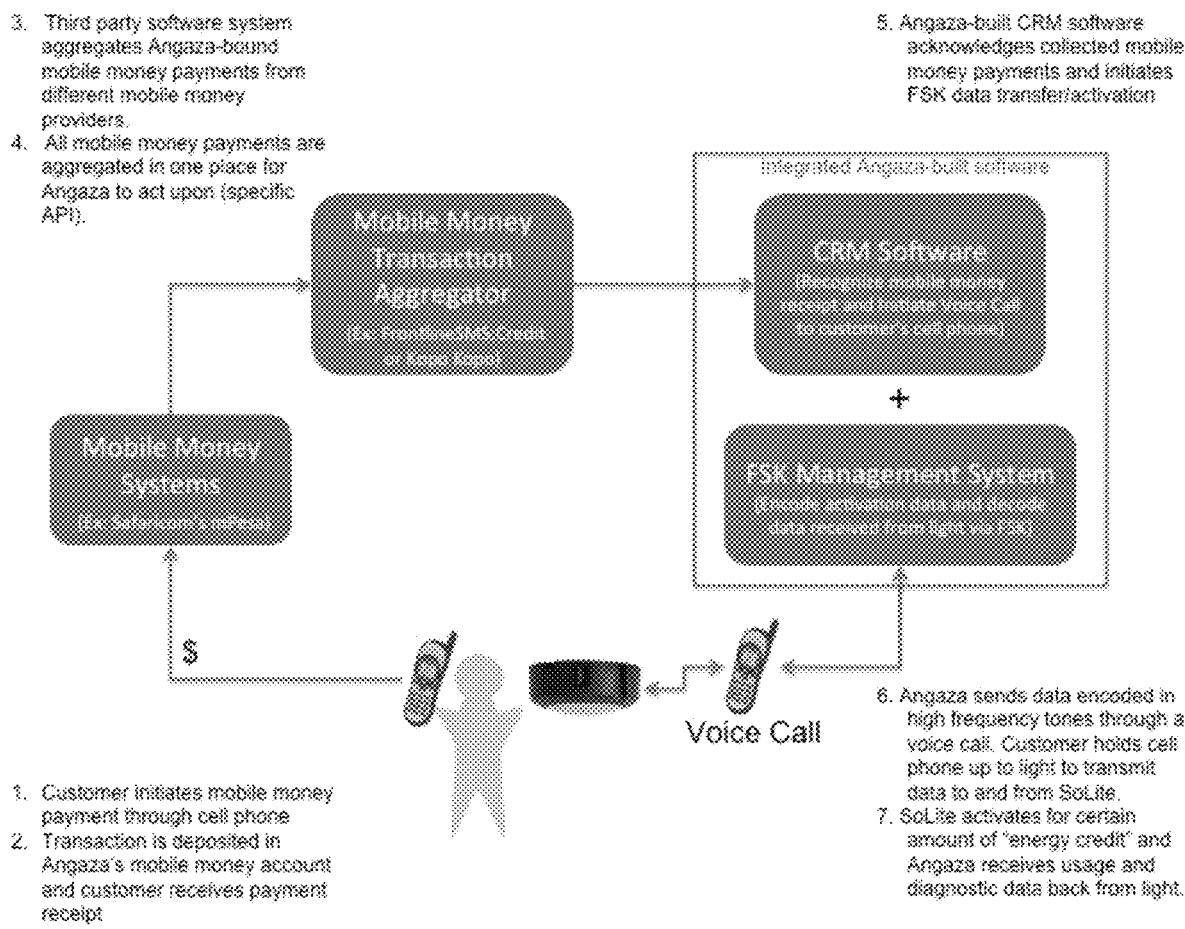
FIG. 4A is a flow diagram that illustrates the communication process flow between the parties in the PAYG method according to embodiments.

FIG. 4A is a flow diagram that illustrates the communication process flow between the parties in the PAYG method. 1. A customer initiates mobile money payment through a cell phone. 2. A transaction is deposited in the provider's (ANGAZA's) mobile money account and the customer receives a payment receipt. 3. A third party software system aggregates the provider's mobile money payments from different mobile money providers. 4. In some embodiments, this aggregation software may be part of the provider's back-end system. All mobile money payments are aggregated in one place for the provider to utilize. 5. The provider's back-end software system acknowledges the collection of mobile money payments and initiates transfer of credits/activation of the lighting system. 6. The provider sends data encoded in audible tones through a voice call. The customer holds the cell phone up to the light module to transmit data to and from the light module. 7. The provider activates the lighting system for a certain amount of "energy credit" and the provider receives usage and diagnostic information data back from the light.

Figure 4B:
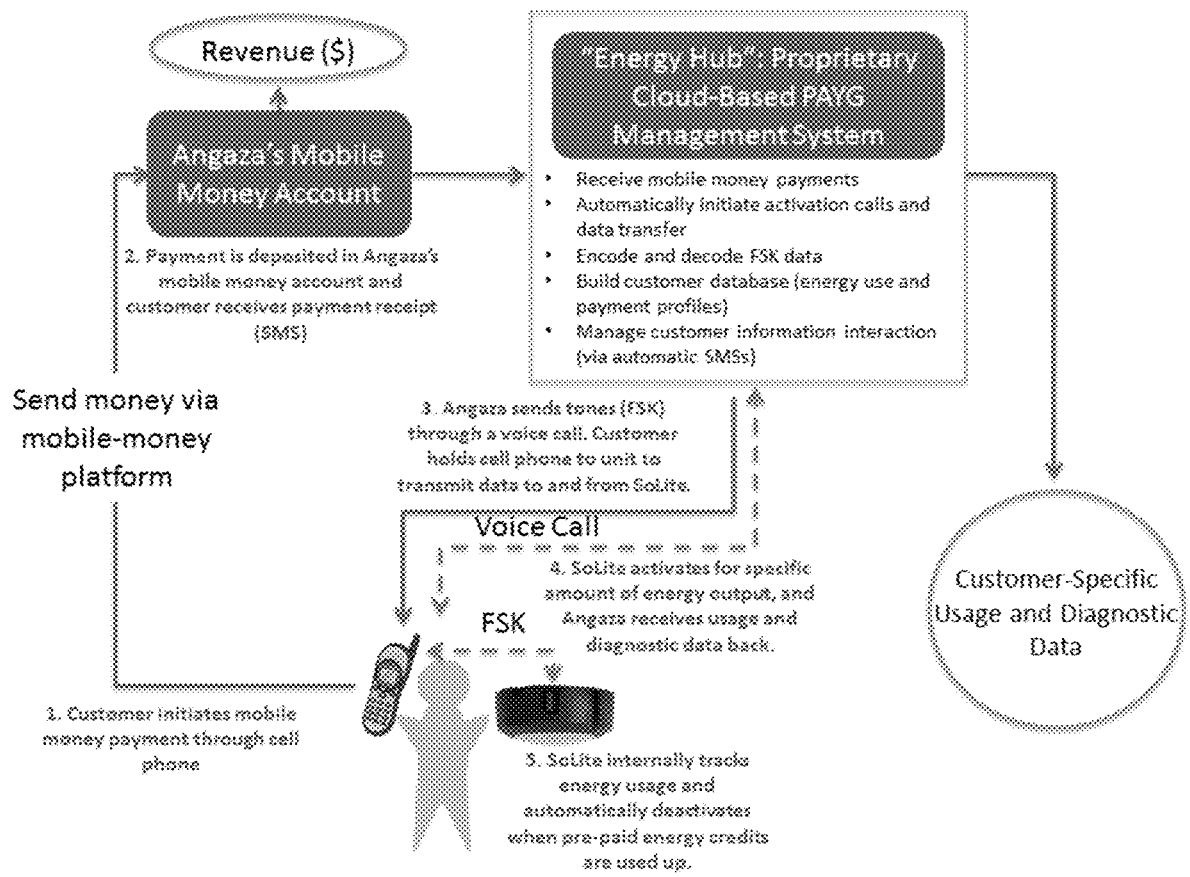
FIG. 4B is a flow diagram that illustrates the communication process flow between the parties with the back-end provider according to embodiments.

FIG. 4B is a flow diagram that illustrates the communication process flow between the parties in the PAYG method, and includes an "Energy hub." 1. A customer initiates mobile money payment through a cell phone. 2. A transaction is deposited in the provider's (ANGAZA's) mobile money account and the customer receives a payment receipt though an SMS text. 3. The provider's back-end software system acknowledges the collection of mobile money payments and sends data encoded in audible tones (e.g. FSK) through a voice call. The customer holds the cell phone to the lighting module to transmit data to and from the module. For example, the data may comprise a transfer of energy credits, activation of the lighting system, or both. 4. The provider activates the lighting system for a certain amount of "energy credit" and the provider receives usage and diagnostic data back from the light. 5. The lighting system internally tracks energy usage and automatically deactivates when an amount of energy credits are depleted. The Energy hub is a cloud-based management system that receives payments from customers, automatically initiates activation calls, transfers data, encodes and decodes FSK data, builds a customer database comprising energy use and payment profiles, and manages customer information interactions. In some embodiments, the customer interactions may occur automatically by using SMS messages.

Figure 5:
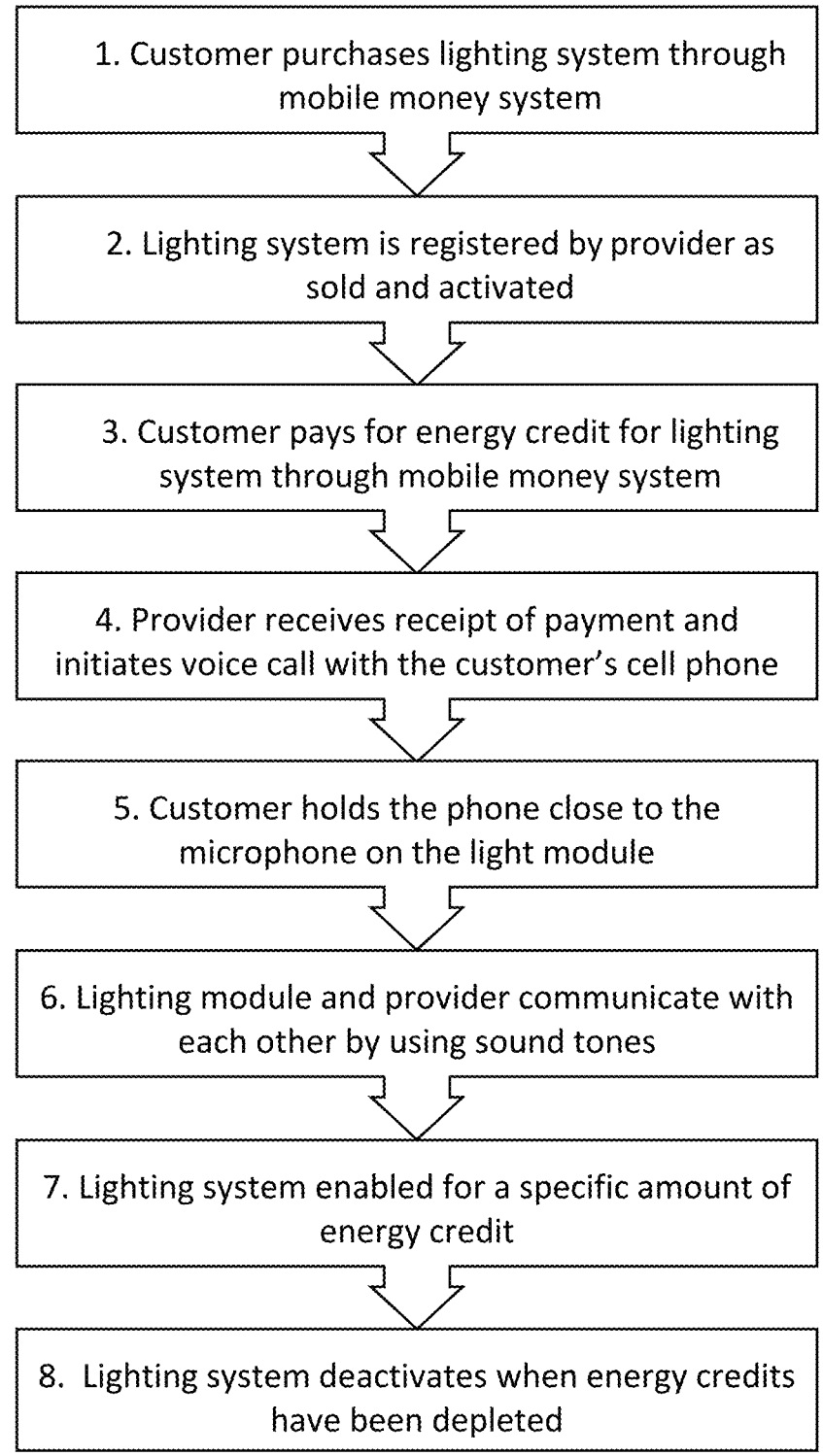
FIG. 5 is a customer experience flow diagram that describes how the customer interacts with the lighting system according to embodiments.

Customer Experience Flowchart:

FIG. 5 is a customer experience flowchart that describes how the customer interacts with the lighting system. 1. Customer buys the lighting system by using the mobile money system. 2. Customer registers the product to their account. This is done by having the customer provide a serial number of the lighting system (probably displayed as a label inside the packaging or on the outside of the lighting system) to the provider. The customer can send this information to the provider by calling or texting (SMS) the provider with this serial number and their cell phone number/mobile money account information. This logs a discrete pairing between the customer's cell phone, mobile money account, and their specific lighting system in the provider's database.

In this embodiment, the pairing between a specific cell phone and a specific lighting unit is stored by the back-end provider as a one-to-one match between the corresponding cell phone number and lighting unit serial number.

In some embodiments, a single cell phone is not paired with a single lighting unit. This allows the customer to operate any cell phone to conduct transactions between the provider and their lighting unit. The customer enters their lighting unit serial number when making a payment via mobile money. During the two-way communication, the provider may identify the lighting unit that is communicating with the provider and reject providing usage credit to the lighting unit if the customer is attempting to add credit to a lighting unit with a serial number that differs from what they entered during the mobile money payment. Thus, pairing between a lighting unit and mobile money account may be determined immediately before the phone call is initiated.

In yet another embodiment, the customer does not enter their lighting unit's serial number when making a payment via mobile money, and no direct pairing is made between the unit and payment until the two-way communication, when a tone sequence transfer occurs. During the tone sequence, the lighting unit communicates its serial number through tones to the back-end provider system and then the pairing is set.

3. A customer pays for energy credits via mobile money infrastructure (e.g., MPesa in Kenya)—or by transfer of credit via a communications or messaging protocol, such as USSD, SMS text messaging, SIM Application Toolkit (STK), or the like. The customer sends the provider a payment for a desired amount of "energy credit" by transferring funds from their mobile money account to provider's mobile money account. The customer may also manually send a cell phone number, or a phone number may be automatically sent with the customer's mobile money account information. 4. The provider acknowledges receipt of the customer's mobile money payment and initiates a voice call to the customer's cell phone or a cell phone designated by the customer. Alternatively, the customer can initiate a call to the provider from any cell phone to start this process after they have send payment via mobile money. 5. The customer holds the phone in close proximity to the unit, using speaker-phone or not. Audible signals from the voice call are played through the phone. 6. Internal microphone (or transceiver) in the unit hears and processes tones. Tones are processed either with firmware or with hardware demodulation. 7. The lighting system is enabled and the customer uses energy until it is depleted and it is time to make their new payment. 8. The lighting system deactivates when energy credits have been depleted.

Figure 6:
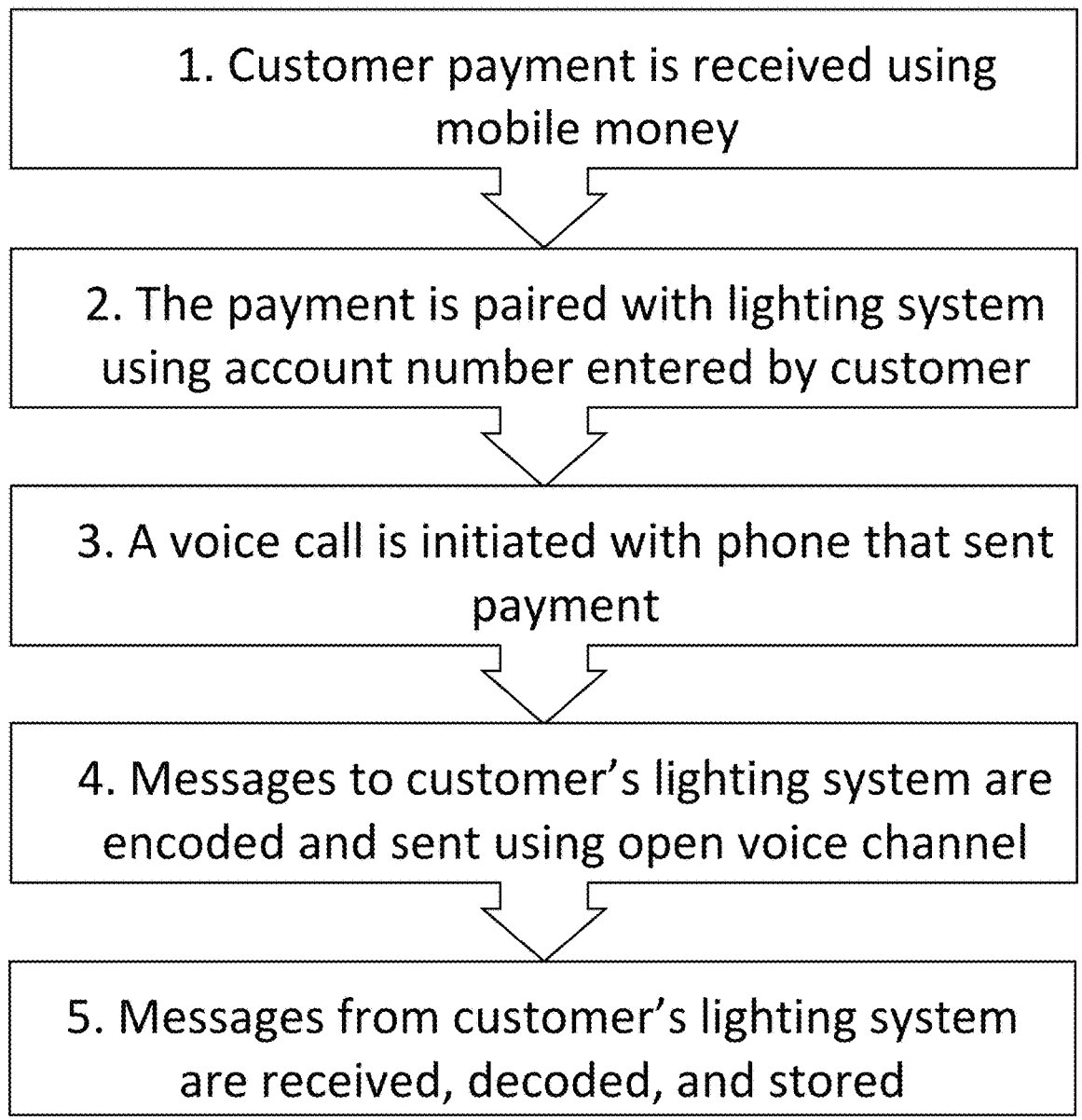
FIG. 6 is a flowchart illustrating the processing of the back-end provider system according to embodiments.

Back-End System Process Flowchart:

FIG. 6 is a flowchart illustrating the processing of the back-end provider system. 1. The provider automatically receives a mobile money payment receipt (for example, in the form of an SMS text message) when the customer pays via mobile money. This receipt is built-in to the mobile money infrastructure, but the provider may either work with the third party software or create its own system to organize these receipts and make them accessible via a provider-independent API. A payment receipt that is not an SMS, but instead an internet-based notification may be utilized in some embodiments. In some embodiments, the credits can be purchased without using the mobile money system. For example, a scratchcard method can be utilized where the customer purchases a code and texts the provider that code to verify they have paid for more energy credit. (Very similar to how many customers purchase prepaid cell phone minutes). 2. The provider's software pairs this SMS receipt (or other notification) with a specific mobile money account and customer. From the customer's product registration, the provider knows which lighting system is owned by this customer. 3. The provider's software automatically initiates a voice call between the provider and the customer after the mobile money payment is made. In some embodiments this call may be initiated by the customer.

4. The provider's back-end software will encode one or more messages in an audio signal (using FSK or other modulation scheme) specific to the target customer's lighting system. These data will be sent over the telecom network to be played from a phone operated by the customer. Messages may include the following information: a preamble that allows that lighting system to identify the beginning of the message (and to synchronize its symbol timing), a number identifying the type of message (e.g., "energy-limit update message"), the body of the message (e.g., the total amount of "energy credit" that has been purchased for the light, based on the amount the customer has paid using a specific $/watt pricing structure), and a message authentication code (e.g., an HMAC using MD5) that allows the lighting system to verify that the specific message was intended for the specific lighting system. Possible modulation schemes include: FSK, ASK, PSK, or any combination thereof (e.g., QAM) to modulate the frequency, amplitude, or phase of an audio-band signal. The data rate may be adapted to the quality of the voice call. To minimize playback fraud messages, the lighting system may be constructed to be idempotent, such that multiple messages have the same effect as a single message. The provider backend sends the total amount of energy credit applied to the unit throughout its lifetime, for example, rather than the amount of credit obtained by the most recent purchase. Other possible data that may be sent to the lighting systems include, for example, software or configuration updates, code to permanently unlock the unit to not require any additional "energy credit" to run, test sequences to identify possible technical issues (could be used with remote customer technical support), requests for specific information from unit (i.e., may request a unit to encode complete PV charge cycle for a day to be sent back with the next transfer of data). In addition to sending data to the lighting system, the provider's software may be used to communicate directly with the customer. The customer may respond via touch tone on their phone (DTMF), SMS, voice, or other. Back-end infrastructure may work to automatically implement this provider-customer information exchange. Another example of this may be a targeted marketing or survey implementation directly with the customer.

5. The provider's backend software can also receive audio-band messages from the lighting system. For example, it can receive a message confirming that its command to the lighting system was successfully received and applied. Messages received from the lighting system may also include a message authentication code that can be checked by the provider's backend software to verify that the message was sent by the specific lighting system. Messages from the lighting system can be decoded and acted upon using the same modulation scheme as used for messages to the lighting system, or a different scheme—for example, to allow higher bit-rate transmission of diagnostic data. The information received from the lighting system by the provider's back-end software may include, but is not limited to, the following: usage data, e.g., how many hours of light the customer uses per night, on what brightness setting, at what time of day, over what intervals; maintenance diagnostic data, e.g., solar panel operating efficiency, battery lifecycle data including how many charge cycles the battery has been through, measured battery capacity, etcetera; geographical location data, e.g., information on where the lighting system has been installed using GPS, cellular triangulation, or another method; customer information using DTMF and the customer's cell phone keypad, e.g., the provider's system can ask if everything is functioning properly and the customer can touch "1" on their cell phone to answer.

The provider's backend software may aggregate data and provide an interface for distributors. The aggregated data may include mobile money payments from multiple providers. The interface may include a payment profile of each deployed lighting unit, collected through the two-way data transfer. The interface may identify lighting units with overdue payments to allow a distributor to follow-up with customers. The interface may also be used to manage lighting unit inventory, customer information, and allow for customizable pricing structures based on lighting unit serial numbers. The aggregated data may be collected from different units, stored as permanent unit-specific data, and used for data analytics. Data analytics may include calculating average data from lighting units and sorting the data, for example, by geography, distributor, pricing, and the like.

The provider's backend software may include automated follow-up capabilities. For example, a query SMS text message may be sent to customers based on an average energy usage profile to alert the customers that they have not added energy credits and that their remaining credits are estimated to deplete soon. The follow-up protocol may also message customers if diagnostic data indicate a need to replace the battery or a need to clean the solar panel.

The backend system may manage failed communication sequences by, for example, automatically refunding payment to a customer and sending a message instructing the customer to try communicating again. The system may allow the customer to automatically initiate another call by directly contacting the provider through SMS text messaging, voice call, or the like.

The backend provider system may also provide in-country infrastructure for managing telecommunications, to reduce costs. For example, the backend software can dynamically recognize a telecom service provider that delivered a payment and send a call through that network to decrease costs.

The provider's backend software may include error correction functionality for interpreting and decoding tone sequences with lost data. A forward error correction (FEC) is used for transmission errors caused by ambient noise or by dropped portions of a phone call, to prevent the loss of an entire data packet. FEC techniques may include Hamming and convolutional codes. Robust error detection techniques used by the backend provider software may include a cyclic redundancy check (CRC) that allows participants in communication to discard corrupted data packets. A typical communication protocol in such a system would retry transmission of dropped or discarded packets.

Figure 7:
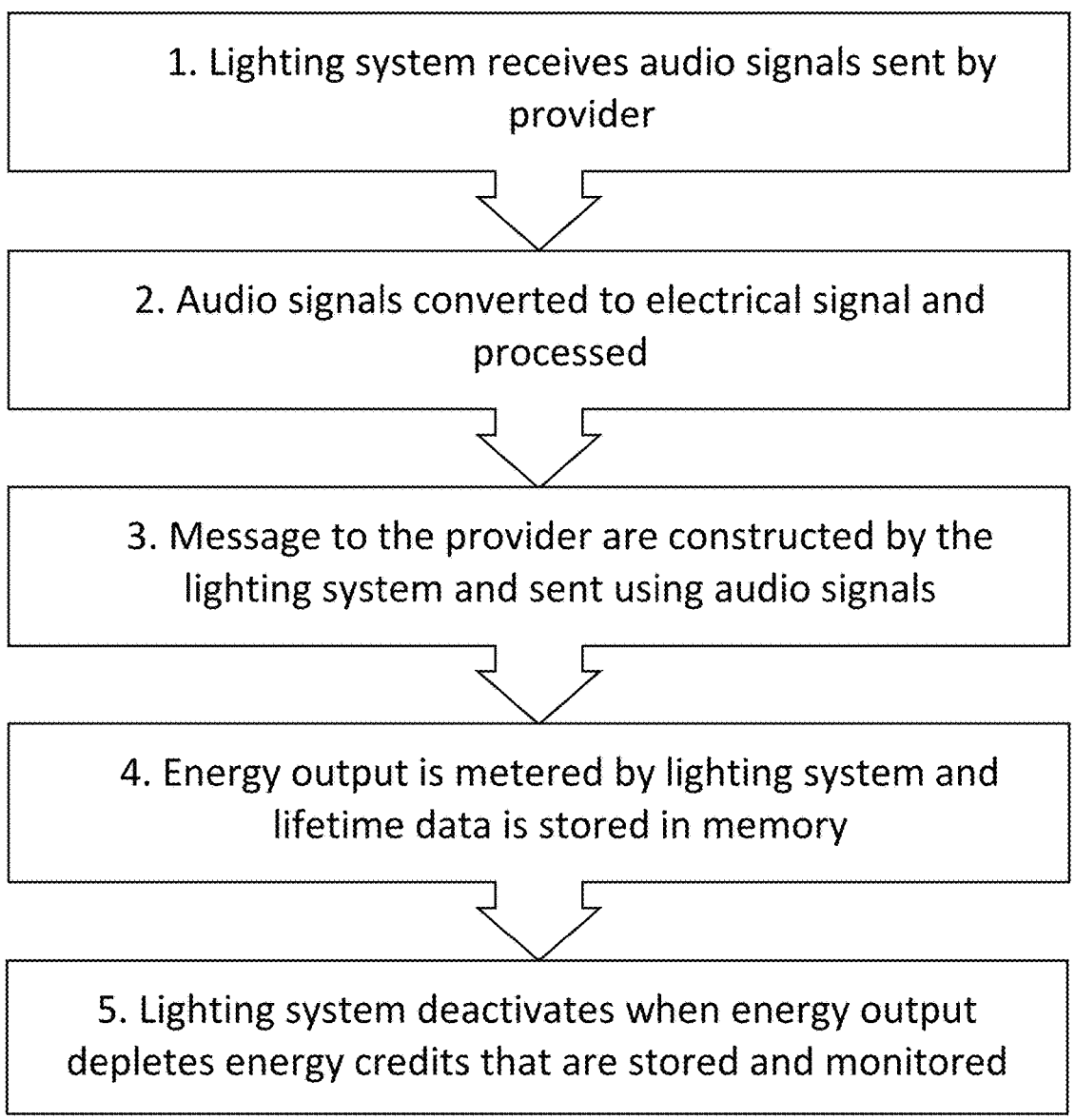
FIG. 7 is a flowchart illustrating the internal processing of the lighting system according to embodiments.

Lighting System Internal Processing Flowchart:

FIG. 7 is a flowchart illustrating the internal processing of the lighting system. 1. The lighting system may be switched to a "communication mode" by the customer to signal that the microprocessor should actively "listen" for a message, or the microprocessor can be constantly or periodically "listening" for incoming messages. 2. A microphone or transceiver within the lighting system converts the audio signal into an electrical signal for the internal microprocessor (if decoded with firmware) or demodulation hardware (if decoded with hardware). The microprocessor and/or other communications hardware demodulates, verifies, and acts on the message sent by the provider's backend software. Possible message contents are listed in the description of the backend system process flowchart.

3. Using its speaker or transceiver, the lighting system can also construct a message for transmission to the provider's backend software, and output a modulated audio signal encoding that message. The message may include, but is not limited to, the following information: an authentication code based on the message and the unit's internal unique identifier; a confirmation that an earlier message has been received, processed, and that there have been no errors; and any usage or maintenance diagnostic data.

4. Internal hardware or firmware within the lighting system can actively track and store lifetime data (e.g., hours of light used) for later access. These data may be stored in a flash memory or EEPROM, for example. Data may be stored in such a way as to perform "wear leveling" across sections of onboard storage (using a log-structured file system, for example, or block remapping), such that areas of onboard storage undergo similar numbers of write/erase cycles. Data may be relayed back to the provider's backend software and subsequently erased within the unit, or it may be stored within unit indefinitely to be accessed at a later date (for example, if a unit is brought back to a distributor, the distributor may be able to connect to the unit to gather and download data).

5. Internal hardware/firmware within the unit will monitor energy output (i.e., track how many watt-hours are used) and coordinate this with available "energy credit." The unit will automatically deactivate or switch to a "credit depleted" output mode when "energy credit" is exhausted, during which the user cannot access the normal functions of the unit.

In addition to the solar power applications discussed above, the disclosed pay-as-you-go technology can be used for many additional product applications to enable customers or users to pay in incremental amounts over time. For example, clean cook stoves enable efficient and healthy cooking for rural populations in the developing world. By adding the disclosed pay-as-you-go energy technology to a cook stove with an electrical component, the pay-as-you-go technology can monitor energy usage, receive these data remotely from the deployed unit, and track total usage. This is directly applicable and useful for companies that seek to be carbon credit-eligible and need to prove that their clean cook stoves are directly replacing traditional, high pollution methods of cooking. Additionally, other possible applications of this technology include clean water dispensers, in populations where treated, filtered water is a rarity. With a village-owned, communal water treatment kiosk, customers may purchase a subscription to this treated water, or pre-pay for a specific volume of water on a weekly or monthly basis with this pay-as-you-go technology. Using their cell phones to transmit activation codes and communicate with the kiosk, they can interact with the water dispenser and receive a proportional amount of dispensed water based on the amount they have pre-paid. The kiosk will remotely communicate with the provider's backend infrastructure via the cellular network to regulate multiple users and verify a specific cell phone is paired with a specific pre-paid amount, to eliminate fraudulent usage. Other applications include micro-grid meters, grid-connected meters, and electronic health care products that can be provided and managed in a pay-as-you-go manner. These additional technology applications are two examples, and are not meant to be an exhaustive representation of possible usages. Persons skilled in the art would understand that these concepts could be applied to additional applications.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

The invention claimed is:

1. A pay-as-you-go electrical apparatus for providing power to a connected device comprising:
   a power module configured to provide power to the connected device;
   a transceiver configured to transmit and receive audio-band signals for two-way communication between the electrical apparatus and a provider system through a mobile telephone that is connected to the provider system via an open voice call channel;
   a control system comprising a processor and a memory configured to enable the electrical apparatus to provide power to the connected device when activated with usage credits, monitor usage of the electrical apparatus, track remaining usage credits, and disable the electrical apparatus from providing power to the connected device when there are no remaining usage credits; and
   a battery for providing power for the connected device to the power module;
   wherein the control system is configured to update usage credit information by:
      encoding usage information of the electrical apparatus into a first set of audio-band signals for transmission by the transceiver to the provider system through the mobile telephone via the open voice call channel, the usage information comprising an amount of usage credits used by the electrical apparatus, and
      decoding control information encoded into a second set of audio-band signals received by the transceiver from the provider system through the mobile telephone via the open voice call channel, the control information comprising an amount of usage credits to be added to the electrical apparatus and an authentication code that allows the electrical apparatus to verify that the control information was sent by the provider system and is intended for the electrical apparatus.

2. The pay-as-you-go electrical apparatus for providing power to a device of claim 1, wherein the device comprises a lighting unit.

3. The pay-as-you-go electrical apparatus for providing power to a device of claim 1, wherein the power module comprises an electrical outlet to connect the device.

4. The pay-as-you-go electrical apparatus for providing power to a device of claim 1, wherein the transceiver comprises:
   a speaker configured to generate audio-band signals for communicating with the provider system through the mobile telephone; and
   a microphone configured to receive audio-band signals for communicating with the provider system through the mobile telephone.

5. The pay-as-you-go electrical apparatus for providing power to a device of claim 1, further comprising a solar panel configured to charge the battery.

6. The pay-as-you-go electrical apparatus for providing power to a device of claim 1, wherein the power module comprises one or more light emitting diode (LED) lighting sources.

7. The pay-as-you-go electrical apparatus for providing power to a device of claim 1, wherein the electrical apparatus is configured to communicate with the provider system using text messages.

8. The pay-as-you-go electrical apparatus for providing power to a device of claim 1, wherein the audio-band signals comprise payment confirmation notification, usage, and diagnostic data to the provider system.

9. The pay-as-you-go electrical apparatus for providing power to a device of claim 1, wherein the electrical apparatus supports one or more modes indicating the state of the apparatus.

10. The pay-as-you-go electrical apparatus for providing power to a device of claim 1, wherein the electrical apparatus further comprises an indicator indicating a status of usage credits.

11. A pay-as-you-go lighting apparatus comprising:
a lighting module configured to provide lighting to a customer;
a transceiver configured to transmit and receive audio-band signals for two-way communication between the lighting apparatus and a provider system through a mobile telephone that is connected to the provider system via an open voice call channel;
a control system comprising a processor and a memory configured to enable the lighting apparatus to provide lighting when activated with usage credits, monitor usage of the lighting apparatus, track remaining usage credits, and disable the lighting apparatus from providing lighting when there are no remaining usage credits; and
a battery for powering the lighting module;
wherein the control system is configured to update usage credit information by:
encoding usage information of the lighting apparatus into a first set of audio-band signals for transmission by the transceiver to the provider system through the mobile telephone via the open voice call channel, the usage information comprising an amount of usage credits used by the lighting apparatus, and
decoding control information encoded into a second set of audio-band signals received by the transceiver from the provider system through the mobile telephone via the open voice call channel, the control information comprising an amount of usage credits to be added to the lighting apparatus and an authentication code that allows the lighting apparatus to verify that the control information was sent by the provider system and is intended for the lighting apparatus.

12. The pay-as-you-go lighting apparatus of claim 11, wherein the lighting module further comprises an electrical outlet to connect a device.

13. The pay-as-you-go lighting apparatus of claim 11, wherein the transceiver comprises:
a speaker configured to generate audio-band signals for communicating with the provider system through the mobile telephone; and
a microphone configured to receive audio-band signals for communicating with the provider system through the mobile telephone.

14. The pay-as-you-go lighting apparatus of claim 11, further comprising a solar panel configured to charge the battery.

15. The pay-as-you-go lighting apparatus of claim 11, wherein the lighting module comprises one or more light emitting diode (LED) lighting sources.

16. The pay-as-you-go lighting apparatus of claim 11, wherein the lighting apparatus is configured to communicate with the provider system using text messages.

17. A method performed by a pay-as-you-go lighting apparatus comprising:
obtaining energy credit information for a user and the lighting apparatus from a provider system by receiving, by a transceiver of the lighting apparatus that is configured to transmit and receive audio-band signals for two-way communication between the lighting apparatus and the provider system through a mobile telephone that is connected to the provider system via an open voice call channel, a first set of audio-band signals from the mobile telephone that comprise an amount of usage credits to be added to the lighting apparatus and an authentication code that allows the lighting apparatus to verify that the energy credit information was sent by the provider system and is intended for the lighting apparatus;
enabling, by a control system of the lighting apparatus, the lighting apparatus to provide lighting when the lighting apparatus is activated with usage credits in accordance with the energy credit information; and
transferring usage information concerning usage of the lighting apparatus to the provider system by transmitting, by the transceiver, a second set of audio-band signals that comprise the usage information via the mobile telephone to the provider system via the open voice call channel, the usage information comprising an amount of usage credits used by the lighting apparatus.

18. The method of claim 17, wherein the audio-band signals comprise data identifying a location of the lighting apparatus.

19. A method of remotely managing pay-as-you-go apparatuses by a provider system, comprising:
receiving a payment message associated with a user account;
encoding a status message for transmitting to a pay-as-you-go apparatus over a first set of audio-band signals, the pay-as-you-go apparatus comprising a transceiver configured to transmit and receive audio-band signals for two-way communication between the pay-as-you-go apparatus and the provider system and a control system configured to enable the pay-as-you-go apparatus to provide at least one of power and light when activated with usage credits, monitor usage of the pay-as-you-go apparatus, track remaining usage credits, and disable the pay-as-you-go apparatus from providing the at least one of power and light when there are no remaining usage credits, wherein the status message comprises usage credit information generated based on the received payment message and an authentication code for allowing the pay-as-you-go apparatus to verify that the status message is sent by the provider system and is intended for the pay-as-you-go apparatus;

transmitting the encoded status message to the pay-as-you-go apparatus through a mobile telephone connected to a telephone network via an open voice call channel; and receiving over the telephone network a usage message sent by the pay-as-you-go apparatus over a second set of audio-band signals through the mobile telephone, the usage message comprising an amount of usage credits used by the pay-as-you-go apparatus.

20. The method of remotely managing pay-as-you-go apparatuses of claim 19, further comprising associating the payment message with an account and the pay-as-you-go apparatus.

21. The method of remotely managing pay-as-you-go apparatuses of claim 19, wherein the payment message identifies the apparatus.

22. The method of remotely managing pay-as-you-go apparatuses of claim 19, further comprising initiating a mobile telephone call to transmit the encoded status message.

23. The method of remotely managing pay-as-you-go apparatuses of claim 22, wherein the encoded status message comprises a body and at least one of a preamble and a number identifying a type of message.

24. The method of remotely managing pay-as-you-go apparatuses of claim 23, wherein the body of the encoded status message comprises a software update, a code to unlock the apparatus, or a test sequence to identify technical issues with the apparatus.

25. The method of remotely managing pay-as-you-go lighting apparatuses of claim 19, wherein the usage message received from the apparatus confirms that the encoded status message transmitted to the lighting apparatus designates the apparatus.

26. The method of remotely managing pay-as-you-go apparatuses of claim 19, further comprising:
aggregating data collected from multiple apparatuses;
updating a profile for each of the apparatuses;
identifying apparatuses with overdue payments based on an average energy usage determined from the profile for each of the apparatuses; and
messaging users about the overdue payments and diagnostic information determined by analyzing the data collected.

27. The method of remotely managing pay-as-you-go apparatuses of claim 19, wherein the pay-as-you-go apparatus is a lighting apparatus.

* * * * *